(12) United States Patent
Shaham et al.

(10) Patent No.: US 7,423,972 B2
(45) Date of Patent: Sep. 9, 2008

(54) SYSTEM AND METHOD FOR A TRANSMISSION RATE CONTROLLER

(75) Inventors: Oded Shaham, Haifa (IL); Avi Sagiv, Tel Aviv (IL); Yair Shapira, Haifa (IL); Noam Zakai, Haifa (IL)

(73) Assignee: Flash Networks Ltd., Herzliya (IL)

( * ) Notice: Subject to any disclaimer, the term of this patent is extended or adjusted under 35 U.S.C. 154(b) by 787 days.

(21) Appl. No.: 10/432,835

(22) PCT Filed: Nov. 28, 2001

(86) PCT No.: PCT/IL01/01095

§ 371 (c)(1), (2), (4) Date: Dec. 4, 2003

(87) PCT Pub. No.: WO02/45275

PCT Pub. Date: Jun. 6, 2002

(65) Prior Publication Data

US 2004/0071085 A1    Apr. 15, 2004

(51) Int. Cl.
*H04L 12/00* (2006.01)

(52) U.S. Cl. ...................................... 370/236; 370/508

(58) Field of Classification Search ......... 370/232–234, 370/236, 465, 235, 238, 508
See application file for complete search history.

(56) References Cited

U.S. PATENT DOCUMENTS

| | | | | |
|---|---|---|---|---|
| 3,189,734 A | * | 6/1965 | Frady, Jr. et al. ............... | 700/44 |
| 4,769,815 A | * | 9/1988 | Hinch et al. ................. | 370/236 |
| 5,014,265 A | | 5/1991 | Hahne et al. | |
| 5,163,046 A | * | 11/1992 | Hahne et al. ................. | 370/237 |
| 5,193,151 A | * | 3/1993 | Jain ........................... | 709/237 |
| 5,313,454 A | * | 5/1994 | Bustini et al. ............... | 370/231 |
| 5,390,176 A | * | 2/1995 | Schoute et al. ........... | 370/395.7 |
| 5,463,620 A | * | 10/1995 | Sriram ....................... | 370/412 |
| 5,521,907 A | * | 5/1996 | Ennis et al. .................. | 370/253 |
| 5,612,949 A | * | 3/1997 | Bennett ...................... | 370/253 |
| 5,631,935 A | * | 5/1997 | Ginossar ..................... | 709/233 |
| 5,668,951 A | | 9/1997 | Jain et al. | |
| 5,802,106 A | * | 9/1998 | Packer ........................ | 375/225 |

(Continued)

FOREIGN PATENT DOCUMENTS

WO    WO 99 46902 A    9/1999

OTHER PUBLICATIONS

G. Brown, M. Gouda, and R. Miller, Block Acknowledgment: Redesigning the Window Protocol, Apr. 1991, IEEE Transactions on Communications, vol. 39, No. 4.*

(Continued)

*Primary Examiner*—Kwang B. Yao
*Assistant Examiner*—Andrew Lai
(74) *Attorney, Agent, or Firm*—Pearl Cohen Zedek Latzer, LLP

(57) ABSTRACT

A method for proposing at least one transmission rate change including calculating a plurality of latency values, computing at least one derivative-based proposed change from the plurality of latency values, and proposing a rate change selected from the at least one derivative-based proposed change. Also provided is a system including a rate controller controlling the transmission rate of data between two stations over a network and a rate reporter in communication with the rate controller.

35 Claims, 7 Drawing Sheets

U.S. PATENT DOCUMENTS

| | | | | |
|---|---|---|---|---|
| 5,802,160 | A | * | 9/1998 | Kugell et al. ........... 379/211.04 |
| 5,961,599 | A | * | 10/1999 | Kalavade et al. ............ 709/224 |
| 6,141,324 | A | * | 10/2000 | Abbott et al. ............... 370/236 |
| 6,205,120 | B1 | | 3/2001 | Packer et al. |
| 6,269,078 | B1 | * | 7/2001 | Lakshman et al. .......... 370/230 |
| 6,769,029 | B1 | * | 7/2004 | Seki et al. ................... 709/232 |

OTHER PUBLICATIONS

H. Ohnishi, T. Okada and K. Noguchi, Flow Control Schemes and Delay/Loss Tradeoff in ATM Networks, Dec. 1988, IEEE Journal on Selected Areas in Communications, vol. 6. No. 9.*

Brown et al, "Block Acknowledgement: Redesigning the Window Protocol", IEEE Transaction on Communications, vol. 39, No. 4, Apr. 1991.*

Sisalem D et al.: "The Loss-Delay Adjustment Algorithm: A TCP-friendly Adaptation Scheme" German Ministry of Education and Research, Jul. 8, 1998I, Retrieved from the Internet: <URL:http://www.cs.columbia.edu/(hgs/papers/Sisa9807_Loss.pdf>.

Lawrence S. Brakmo et al.: "TCP Vegas: New Techniques for Congestion Detection and Avoidance", Department of Computer Science, University of Arizona, Tucson, AZ 85721, 1994.

European Search Report from EP 01999049.

International Search Report from WO 02/45275.

* cited by examiner

SYSTEM AND METHOD FOR A TRANSMISSION RATE CONTROLLER

FIELD OF THE INVENTION

The present invention relates generally to network based communication, specifically to improvements in bandwidth use.

BACKGROUND OF THE INVENTION

Data communication networks are built from various communication lines connected to each other. Every communication line has a specific capacity (or bandwidth), generally measured in units of data per time, typically kilobits per second (kbps). When data is transmitted over a communication line by some station in the network, hereinbelow referred to as the sitting station, it is transmitted at the specific transmission rate of that communication line. Between the transmitting station and the communication line there is usually a queue of limited size, in which data waits to be sent if the line is occupied. If a station attempts to transmit data faster than the capacity of the line, the excess data is stored in the queue until it can be sent. If too much data is sent to the queue, the buffer will overflow and data will be lost (or dropped). Therefore, a transmitting station has to adjust its transmission rate to the capacity of the line.

Furthermore, this queue may be distributed in several locations along the communication lines in buffers. Some of these buffers may be "far" from the sender and may be located in intermediary nodes along the network. These buffers of intermediary nodes may not be controlled or measured by the sender. Thus, in adjusting its transmission rate, a transmitting station also must take into account the state of the queue (e.g. whether the queue is accumulating or emptying).

These networks use standard communication protocols to allow communication between computers, for example, Transmission Control Protocol/Internet Protocol (TCP/IP) and User Datagram Protocol/Internet Protocol (UDP/IP). In the transfer of data or information between computers, standard methods are used, for example HyperText Transfer Protocol (HTTP) Internet browsers and HTTP servers, file transfer protocol (FTP) servers, etc. Unfortunately, the rate control mechanism standards known in the art are generally loss based. For example, in TCP/IP communications the rate of transmission is increased until data loss is detected, guaranteeing lost packets that will have to be resent.

Users of data communication networks often experience severe communication constraints due to non-optimal handling of the data transmission. This may be due to an inefficient use of the network bandwidth and a rate of data transmittal slower than necessary. Contributing to these are the inherent inefficiencies of existing communication protocol standards and the current explosion of network traffic, which is overloading the capacity of networks.

SUMMARY OF THE INVENTION

There is provided, in accordance with an embodiment of the present invention, a method for controlling the transmission rate of data between stations. The method may include calculating a latency value per packet of a plurality of packets and generating at least one rate change from the one latency value.

Moreover, in accordance with an embodiment of the present invention, the calculating uses times from two independent clocks.

Furthermore, in accordance with an embodiment of the present invention, the latency value may be a two-way latency or a one-way latency.

Still further, in accordance with an embodiment of the present invention, the method further includes calculating a plurality of discrete derivatives of the latency value.

Moreover, in accordance with an embodiment of the present invention the calculating further includes using a transmission rate of at least one packet from the plurality of packets.

Furthermore, in accordance with an embodiment of the present invention, the generating further includes using a sign-significance filter.

In addition, in accordance with an embodiment of the present invention, the generating further includes using a zero derivative increase.

Moreover, in accordance with an embodiment of the present invention, the generating further includes computing at least one derivative-based proposed change.

Still further, in accordance with an embodiment of the present invention, the generating further includes using a loss-based decrease.

Moreover, in accordance with an embodiment of the present invention, the generating further includes taking a minimum of the loss-based decrease and the derivative-based proposed change.

Furthermore, in accordance with an embodiment of the present invention, the generating further includes using a future rate change.

In addition, in accordance with an embodiment of the present invention, the generating further includes computing a weighted average of the at least one rate change.

Still further, in accordance with an embodiment of the present invention, the generating further includes using the capacity of at least one communication line.

Moreover, in accordance with an embodiment of the present invention, the protocol maybe a connectionless protocol or connection protocol.

Furthermore, in accordance with an embodiment of the present invention, the connectionless protocol may be UDP/IP and the connection protocol may be TCP/IP.

Moreover, in accordance with an embodiment of the present invention, the generating may be able to be done on a transmitting side or on a reporting side.

There is also provided, in accordance with an embodiment of the present invention, a method for proposing at least one transmission rate change. The method may include calculating a plurality of latency values, computing at least one derivative-based proposed change from the plurality of latency values, and proposing a rate change selected from the at least one derivative-based proposed change.

Moreover, in accordance with an embodiment of the present invention, the calculating further includes using a sign-significance filter.

Furthermore, in accordance with an embodiment of the present invention, the calculating further includes choosing at least one discrete derivative of the latency.

In addition, in accordance with an embodiment of the present invention, the computing further includes checking packet loss.

Still further, in accordance with an embodiment of the present invention, the computing further includes selecting a minimum between a loss-based decrease and the at least one derivative-based proposed change.

Moreover, in accordance with an embodiment of the present invention, the computing further includes reducing the at least one derivative-based proposed change by a future rate change.

Furthermore, in accordance with an embodiment of the present invention, the proposing further includes figuring a weighted average of results of the computing.

In addition, in accordance with an embodiment of the present invention, the proposing further includes comparing results of the computing to line capacity.

There is also provided, in accordance with an embodiment of the present invention, a system including a rate controller controlling the transmission rate of data between two stations over a network and a rate reporter in communication with the rate controller.

Moreover, in accordance with an embodiment of the present invention, the rate controller is located in a transmitting site.

Furthermore, in accordance with an embodiment of the present invention, the rate controller includes at least one transmitting packets table.

In addition, in accordance with an embodiment of the present invention, the rate reporter is located in a receiving site or at an intermediary node along the network.

Moreover, in accordance with an embodiment of the present invention, the rate reporter includes at least one report table.

Furthermore, in accordance with an embodiment of the present invention, the rate reporter may include a unit adapted to send the at least one report table to the rate controller.

In addition, in accordance with an embodiment of the present invention, the rate controller or the rate reporter may include a unit adapted to compute a proposed rate change.

Moreover, in accordance with an embodiment of the present invention, the system may include a unit adapted to compute a proposed rate change from a transmitting packets table.

Furthermore, in accordance with an embodiment of the present invention, the system may include a unit adapted to compute a proposed rate change from a report table.

In addition, in accordance with an embodiment of the present invention, the rate controller and the rate reporter are able to communicate with independent clocks.

There is also provided, in accordance with an embodiment of the present invention, a method for calculating a transmission rate change for a plurality of data units using independent clocks on a transmission station and on a receiving station.

Moreover, in accordance with an embodiment of the present invention, the method includes comparing latency values of consecutive pairs of the plurality of data units.

BRIEF DESCRIPTION OF THE DRAWINGS

The present invention will be understood and appreciated more fully from the following detailed description taken in conjunction with the appended drawings, in which.

DETAILED DESCRIPTION OF THE PRESENT INVENTION

The present invention is a system and method to control data transmission rates. The present invention may comprise an improved system and method for maximizing bandwidth use while minimizing data loss. The present invention may allow the use of independent clocks on the receiving and transmission stations without the requiring the synchronization of the clocks. The transmission rate control system and method of the present invention may be used for connection based and connectionless communication.

Figure 1:
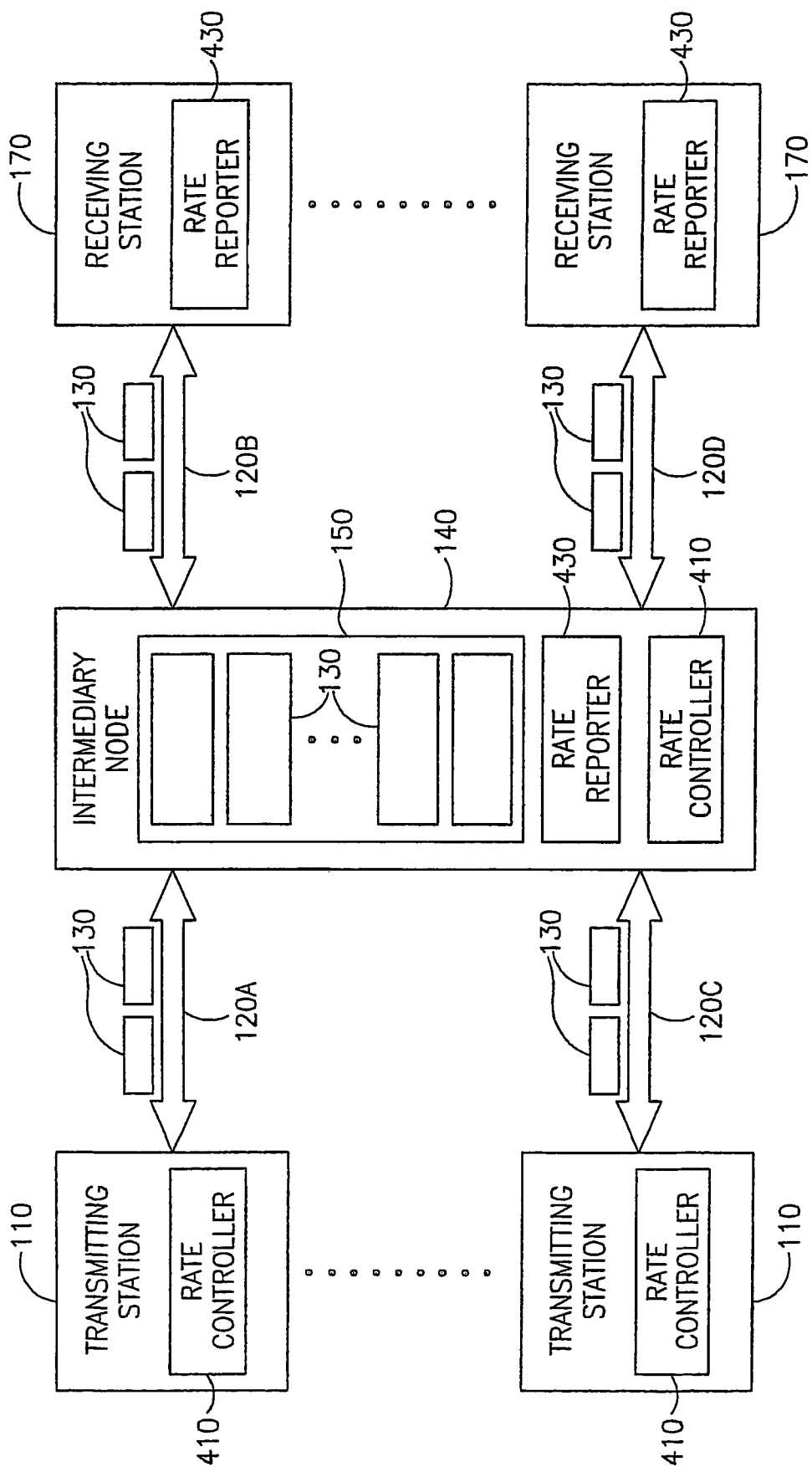
FIG. 1 is a block diagram illustration of a communication environment comprising a transmission rate control system operative in accordance with an embodiment of the present invention.

FIG. 1, to which reference is now made, is a block diagram illustration of a communication environment, which may comprise a transmission rate control system that is operative in accordance with an embodiment of the present invention. The communication system may comprise at least one transmitting station 110, at least one communication line 120, optional intermediary nodes 140, and at least one receiving station 170. The rate controlled transmission system may be comprised of two units, a rate controller 410 and a rate reporter 430. Rate controller 410 may be located in transmitting station 110. Rate reporter 430 maybe located in receiving station 170. Intermediary nodes 140 may comprise a buffer 150, rate controller 410, and rate reporter 430.

Data may be sent from a given transmitting station 110, to a given receiving station 170 over at least one communication line 120A, 120B, 120C, or 120D. The data stream may be divided into chunks 130 of a predetermined size, which may be transmitted over a series of communication lines, for example, 120A-120D, using a known protocol. Along the path between the transmitting station 110 and the receiving station 170, there may be any number of intermediary nodes 140. These intermediary nodes 140 may receive the data and transmit it onwards until the data reaches its destination. Communication lines 120A, 120B, 120C, and 120D may be of the same type or different types. Hereinbelow all communication lines 120A-120D are referred to together as communication lines 120. Such a communication process using transmitting stations 110, communication lines 120, intermediary nodes 140, and receiving stations 170 and standards for its implementation are well known in the art.

The data may be transmitted at a certain rate, which may be measured in kilobits per second (kbps). The transmission rate may be affected by the type of communication line 120 used, since different line types may have a different capacities or bandwidth. For example, data may be divided into packets and may be sent over plain old telephone lines (POTS), Integrated Services Digital Network lines (ISDN), Terrestrial 1 data line (T1), etc. and may use UDP/IP, TCP/IP or any other protocol known in the art. For example, data may be divided into packets when a packet-based protocol such as TCP/IP is used. Hereinbelow the term packets 130 will be used in place of chunks 130 due to the familiarity of the term. It is noted however, that any type of data division as defined in a communication standard may be used.

Intermediary node 140 maybe any type of node along communication line 120, for example, a cell in cellular communication, a satellite station in satellite communication, a gateway between networks, etc. Any number of intermediary nodes 140 may be passed by the data during its transmission through the network. Any of the intermediary nodes 140 may function as a transmitting station 110 and/or a receiving station 170. If so, they may contain their own rate controller 410 and/or rate reporter 430. When acting in either of these capacities they function as per the descriptions of those stations. For simplicity of the description, all intermediary nodes 140 are represented by a single element 140 in FIG. 1 and are referred to together.

Since the transmission rate from intermediary node 140 may be different than its receiving rate, there may be a need for buffer 150 to store a queue of the packets 130 that may be waiting to be sent. Buffer 150 may be under the sole control of intermediary node 140. Neither transmitting station 110 nor receiving station 170 may have access to buffer 150. Intermediary node 140 may transmit packets 130 to receiving station 170 over communication lines 120.

As will be explained in detail hereinbelow with respect to FIG. 3, transmitting station 110 may accumulate information about the transmissions that it sends. This may be done using its rate controller 410 and rate reporter 430 of the receiving station 170 to which the data was sent. Rate controller 410 may then modify the transmission rate of transmitting station 110 as will be explained hereinbelow with respect to FIGS. 2 and 3. Two types of information may be collected by transmitting station 110, the latency of packets and the packet losses. If the latency values are constantly increasing or constantly decreasing, it may indicate that the queue is constantly becoming longer or shorter, respectively.

Figure 2:
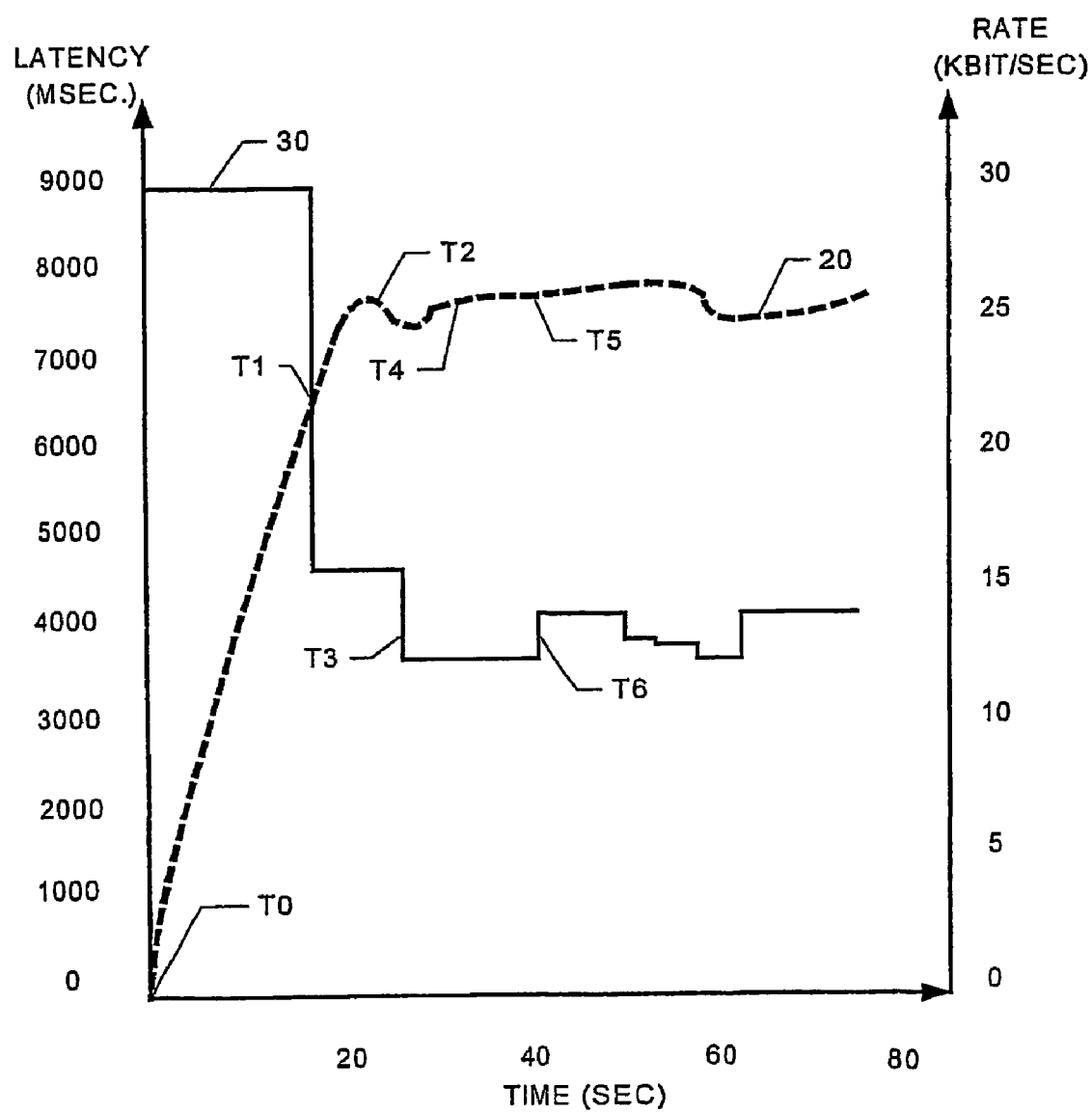
FIG. 2 is a graphic illustration of exemplary changes in both the transmission rate the latency time of packets in the transmission rate control system of FIG. 1, operative in accordance with an embodiment of the present invention.

Reference is now made to FIG. 2, a graphic illustration of exemplary changes in both the transmission rate of packets 130 and the latency time in a communication system comprising a transmission rate control system, operative in accordance with an embodiment of the present invention. Latency is a measure related to the time it takes for a transmission to be received.

There are two types of latency, one-way latency and two-way latency. One-way latency is the time between the moment the data was transmitted by the transmitting station and the moment it was received by the receiving station. Two-way latency, also known as round-trip time (RTT), is the time between the moment the data was transmitted by the transmitting station and the moment the transmitting station received an acknowledgment of the receipt of this data. This assumes that the acknowledgment was sent immediately after the data was received.

The latency may comprise the following time intervals:
1. the waiting time in queues along the way and
2. the time required for the serialization and transmission of the data over the line.

In the case of two-way latency, there may be two further time intervals:
3. the waiting time of the acknowledgment in the queues along the return channel and
4. the time required for the serialization and transmission of the acknowledgment over the return line.

It is assumed that the time intervals 2 and 4 may be constant most of the time, and that interval 3 may not vary greatly for different acknowledgements, since the queue of the receiving side of transmission station 110 may be empty most of the time. Thus, a change in latency may be a good indicator of a change in time interval 1, which may reflect the waiting time in queues along the way. Changes in waiting time in the queue may imply changes in the state of the queue, e.g. the queue size may be increasing or decreasing. Thus, monitoring the latency may provide information about the state of the queue.

Transmission rate curve 30 (solid line) may begin transmitting at the maximum rate possible and may decrease and increase over time. In response to transmission rate curve 30, latency curve 20 (dashed line) may first rise at a dramatic rate as the system begins data transmission. As latency curve 20 increases, the transmission bit rate may be lowered so that data packets 130 may not be lost. Over time, latency curve 20 may settle into a generally consistent latency time that may fluctuate slightly due to changing conditions over the communication lines 120 and the intermediate node 140.

At time $T_0$, transmission of packets 130 may begin at a predetermined maximum rate (e.g. the maximum bit rate of the line). Latency curve 20 may rise until time $T_1$, at which point the latency may be equal to a value predetermined by the method of the present invention. At this time, the transmission rate may be lowered as seen on transmission rate curve 30. Latency curve 20 may still rise, but its slope may change, reflecting the new transmission rate. At time $T_2$, there is a sharp drop in latency curve 20, which may reflect a packet being lost. This may cause the method of the present invention to lower the transmission rate to a predetermined percent of line capacity, as reflected in transmission rate curve 30 at time $T_3$.

The method of the present invention continues monitoring latency times and adjusts transmission times. From time $T_4$-$T_5$, the latency time is almost constant, which may indicate that the transmission rate may be increased $T_6$. Adjustments may be made in the transmission rate that may cause a change in latency time. The method may find a possibly optimal transmission rate for the current communication line conditions as explained hereinbelow, which may be used until a change in conditions is detected.

If the latency values are constantly increasing or constantly decreasing, it may imply that the queue is constantly becoming longer or shorter, respectively. In such a case, the difference between each two consecutive latency values may yield a correction to the current transmission rate. Such a measure may be referred to as the "discrete derivative of the latency" and its use may be referred to as correcting the transmission rate according to the discrete change in the latency time.

There may be situations in which a policy is required to govern dynamic changes to the transmission rate of transmitting station 110. Such a policy may be implemented by the transmission rate control system of the present invention. Examples of such situations may include an unknown line capacity, a line capacity that changes with time, a line that is shared by a varying number of transmitting stations, and a varying number of data flows that may originate from the same station ("shared medium") but may transmit at different rates.

Packet-switching cellular networks provide an example of the above-mentioned situations. The capacity dedicated to data users may change in accordance with the current number of voice users in the cell. The cell capacity is shared among a changing number of clients, which may each transmit at varying rates. Furthermore, a client may switch from a cell having certain conditions (capacity, number of other clients) to a cell with different conditions.

Figure 3:
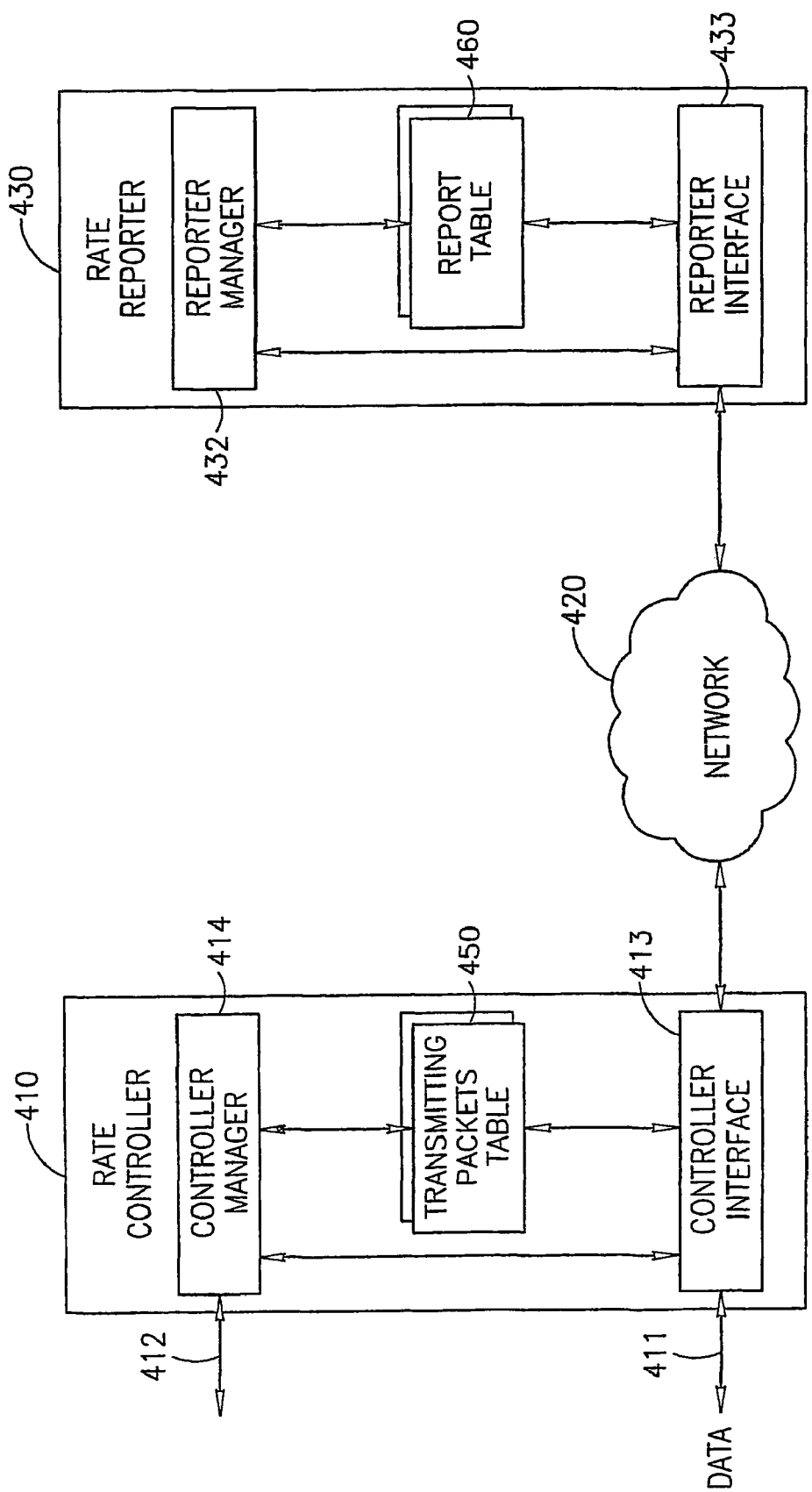
FIG. 3 is a block diagram illustration of the rate transmission control system of FIG. 1, operative in accordance with an embodiment of the present invention.

FIG. 3, to which reference is now made, is a detailed block diagram illustration of the rate transmission control system of the present invention, which may comprise rate controller 410 and rate reporter 430 (of FIG. 1), operative in accordance with an embodiment of the present invention. Also shown is network 420, which represents those communication lines 120 and intermediary nodes 140 that may occur between rate controller 410 and rate reporter 430. In the embodiment of FIG. 3 the parts of the rate transmission control system may be located in different locations—rate controller 410 in transmitting station 110 (FIG. 1) and rate reporter 430 in receiving station 170 (FIG. 1). In a further embodiment of the present invention, they may be in the same location.

Whereas, rate controller 410 may control the transmission rate to more than one rate reporter 430, all calculations and rate adjustments may be done for each rate reporter 430 individually. It is also noted that a given rate reporter 430 may report to more than one rate controller 410. It is noted that different report tables 460 may be generated for each connection and may be sent to the appropriate rate controller 410.

Rate controller 410 may comprise a controller manage 414 and a controller interface 413. Controller manager 414 may create at least one transmitting packets table 450 for each rate reporter 430 it controls. Upon receipt of data packet 130 from transmission station 110 via data bus 411, controller interface 413 may create an entry in transmitting packets table 450, which may comprise the unique identification number (ID) of the packet and the transmission time according to its clock. Optionally, the transmission rate of the packet may also be included. Transmitting packets table 450 may comprise the collected information about the timing of packet 130. Data packet 130 may then be forwarded to network 420 by controller interface 413 for transmission to receiving station 170.

Rate reporter 430 may comprise a reporter manager 432 and a reporter interface 433. Reporter manager 432 may create at least one report table 460 for each rate controller 410 to which it reports. When a packet 130 is received from transmitting station 110, by reporter interface 433, reporter manager 432 may create an entry in report table 460, which may be comprised of the ID of the packet and the receipt time according to its local clock. When a predetermined condition is met, for example a given number of packets have been received or a certain period of time has elapsed, reporter interface 433 may send report table 460 to rate controller 410 over network 420. Report table 460 may be sent as a packet according to any protocol known in the art, for example UDP/IP.

It is noted that if rate reporter 430 is located at receiving station 170, then the reported time may be the time the packet is received. If rate reporter 430 is located at intermediary node 140, it may be placed at the output end of the node, after the processing units and buffers. Thus the reported time from intermediary node 140 may be the time at which packet 130 is transmitted to its next destination.

When a report table 460 is received by controller interface 413 from rate reporter 430, controller manager 414 may associate it with the transmitting packets table 450 created for that rate reporter 430. Controller manage 414 compares the two tables. It may process the two relevant tables as described below. Based on the results of this process and the type of communication line 120, if line type information is available, controller manager 414 may calculate a new recommended transmission rate and may transfer the new rate to transmitting station 110 via control bus 412.

Those skilled in the art will appreciate that the present invention may be implemented as software that may reside in the transmitting computer and/or in the reporting computer or that it may be comprised of a computer connected to the communication line. Furthermore those skilled in the art will appreciate that in case of two-way latency (RTT) the transmitting side and the reporting side may be located in the same station.

Figure 4:
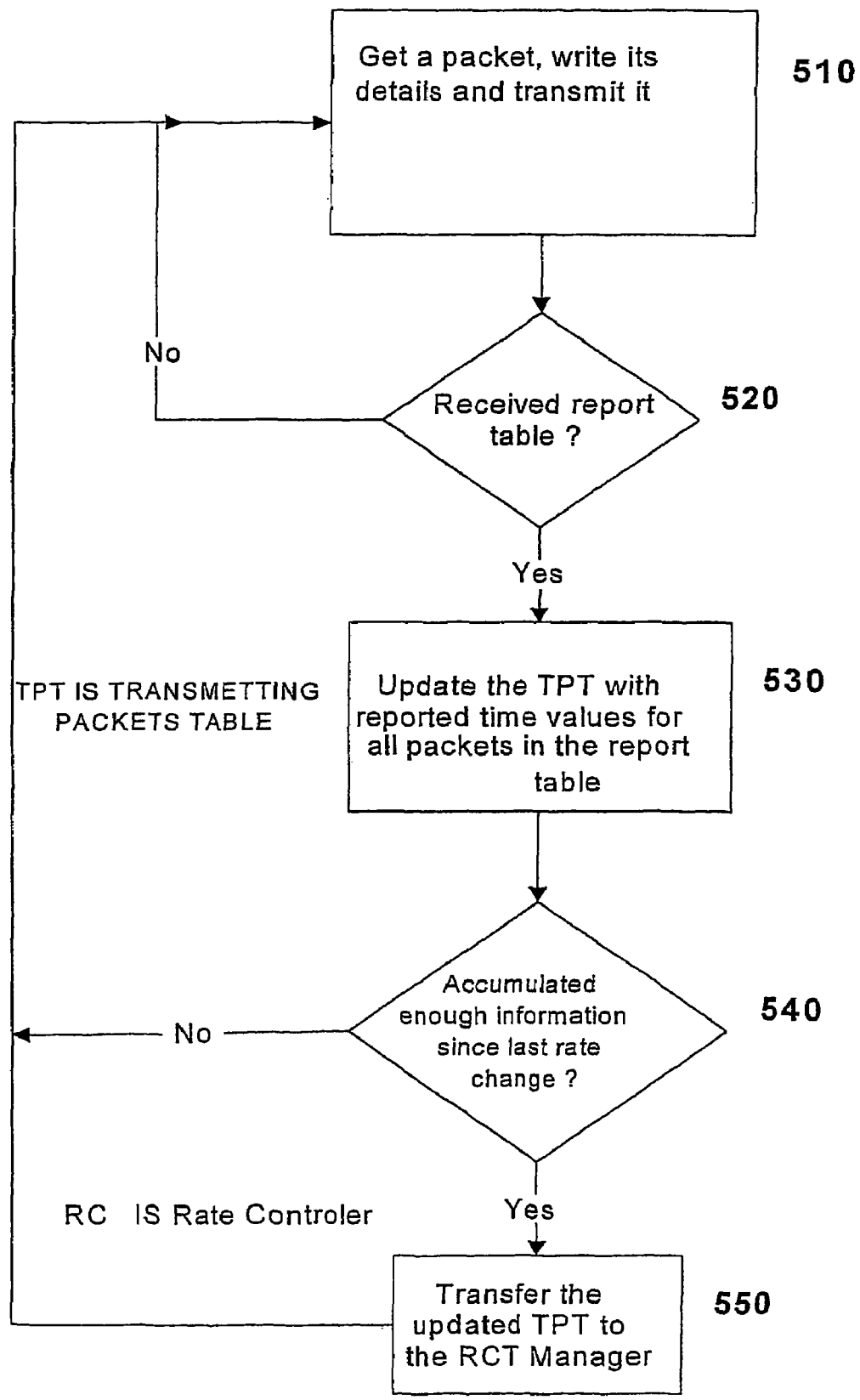
FIG. 4 is a flow chart illustration of a method embodied by the controller interface of FIG. 3, operative in accordance with an embodiment of the present invention.

FIG. 4, to which reference is now made, is a flow chart illustration of a method implemented by controller interface 413 (FIG. 3), operative in accordance with an embodiment of the present invention. When a packet is transmitted, a new entry may be created, by the controller interface 413 in the relevant transmitting packets table 450 (step 510). This entry may comprise the packet ID, the transmission time, and the transmission rate. Packet 130 may then be transmitted to its destination.

Controller interface 413 may check if a report table 460 has been received (step 520). If not it may return to step 510 and may await receipt of the next packet. Report table 460 may contain the receipt time for the packets handled by a given receiving station 170 (according to its clock time). If report table 460 has been received, the appropriate transmitting packets table 450 may be updated with the receipt time reported for each packet (according to its ID number) in report table 460 (step 530). If a packet is not listed in report table 460 but a packet that was transmitted after it does appear in the report, the missing packet may be marked as a lost packet. This may assume that the packets arrive at receiving station 170 in the same sequence in which they were transmitted.

Controller interface 413 may check if enough data has been received in the updated transmitting packets table 450 to perform statistical computations (step 540). If not, controller interface 413 may return to step 510. Otherwise, controller interface 413 may transfer the updated transmitting packet table 450 to the controller manager 414 (step 550), which may begin computations. While computations are performed, interface 413 may return to step 510, which may allow controller interface 413 to continue data transmission and receipt.

The following definitions and table may be useful with respect to FIGS. 5-7 hereinbelow.

Examination window: The part of the transmitting packets table that is examined by the rate recalculation mechanism.

Window Section: A chunk of the examination window in which all the packets were transmitted at the same rate. In one window a number of sections may exist, indicating packets were transmitted at several different rates during the period covered by the window.

Window Section Rate: The rate at which the packets in the section were transmitted.

Latency Calculation: one way latency?receiving time-?transmitting time.

Delta Value: The difference between the latency values of two packets that were transmitted consecutively.

TABLE 1

Updated Partial Transmitting Packets Table

| Packet Number | Transmission Time (T) | Trans. Rate | Receipt time (R) | Latency (L = R − T) | Delta (D = $L_{m+1} - L_m$) |
|---|---|---|---|---|---|
| 5 | 10.15 | 7000 | 22.00 | 11.85 |  |
| 6 | 10.16 | 7000 | 22.02 | 11.86 | 0.01 |
| 7 | 10.17 | 7000 | 22.04 | 11.87 | 0.01 |
| 8 | 10.18 | 7000 | 22.05 | 11.87 | 0.00 |

Table 1 encompasses part of a window section of an updated transmitting packets table 450. The packet number column may comprise the unique packet IDs. The transmission time column may comprise the time, T, at which the packet was sent according to the local clock of the transmitting station. The transmission rate column may comprise the rate at which the packets were sent. Note in this partial table, since only one window section is shown the rate is the same for all the packets. The receipt time column may comprise the time, R, the local time at the receiving station when the packet was received, as reported in the report table. In the case of one way latency, the latency column may comprise the difference between the transmission time and receipt time R−T. The delta column may comprise the delta value, D, comprising the difference between the latency of two consecutive rows, $L_{m+1}-L_m$, of two consecutively sent packets.

This list of delta values may reflect a change in the latency. As may be seen in Table 1, the delta value of different packets may factor out the clock time differences by the subtraction of latency values. This method may thus afford the flexibility of using two independent clocks without worrying about clock synchronization.

Figure 5:
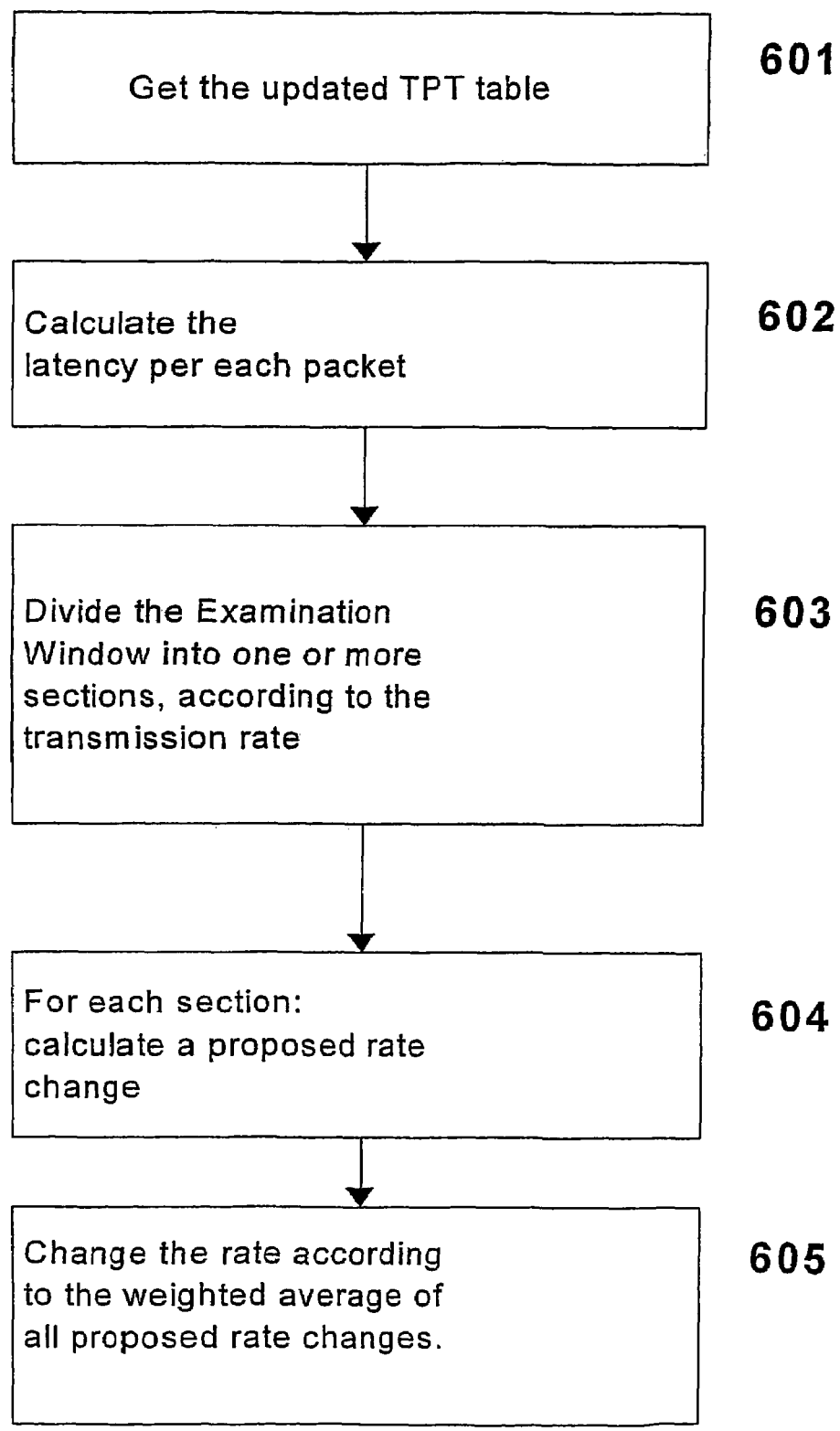
FIG. 5 is a flow chart illustration of a rate recalculation method executed by the controller manager of FIG. 3, operative in accordance with an embodiment of the present invention.

Reference is now made to FIG. 5, a flow chart illustration of the rate recalculation method that may be executed by controller manager 414 of rate controller 410 (FIG. 3), operative in accordance with an embodiment of the present invention. Controller manager 414 may receive the updated transmitting packets table 450 (step 601). It may calculate the one-way latency for each entry. The delta between the latency of the current entry and of the previous entry may also be calculated, and both may be entered into updated transmitting packets table 450 (step 602).

The examination window may be divided into one or more window sections, wherein each section may have the same transmission rate (step 603). A proposed rate change may be calculated for each window section (step 604). This calculation is described in detail hereinbelow with respect to FIG. 7. The final proposed rate change may be an average of all the window sections weighted by the number of delta values in each section.

Based on the proposed rate changes, controller manager 414 may decide to change the transmission rate of transmitting station 110 (step 605) and may send these instructions over control bus 412. However, first a comparison may be made to check that the new rate does not exceed the capacity of communication line 120. If it does, the rate maybe set to the value of the capacity of the communication line. Thus, the capacity of the communication line may function as an upper bound for the proposed transmission rate.

As may be understood from the descriptions of FIGS. 4 and 5, the tasks of rate controller 410 may be divided between two separate units, controller manager 414 and controller interface 413. Thus, those functions that take longer may be performed by controller manager 414, which may leave controller interface 413 to control the data receipt and transmission functions. It is noted however, that in a further embodiment these two logical units may be combined in a single unit.

Figure 6:
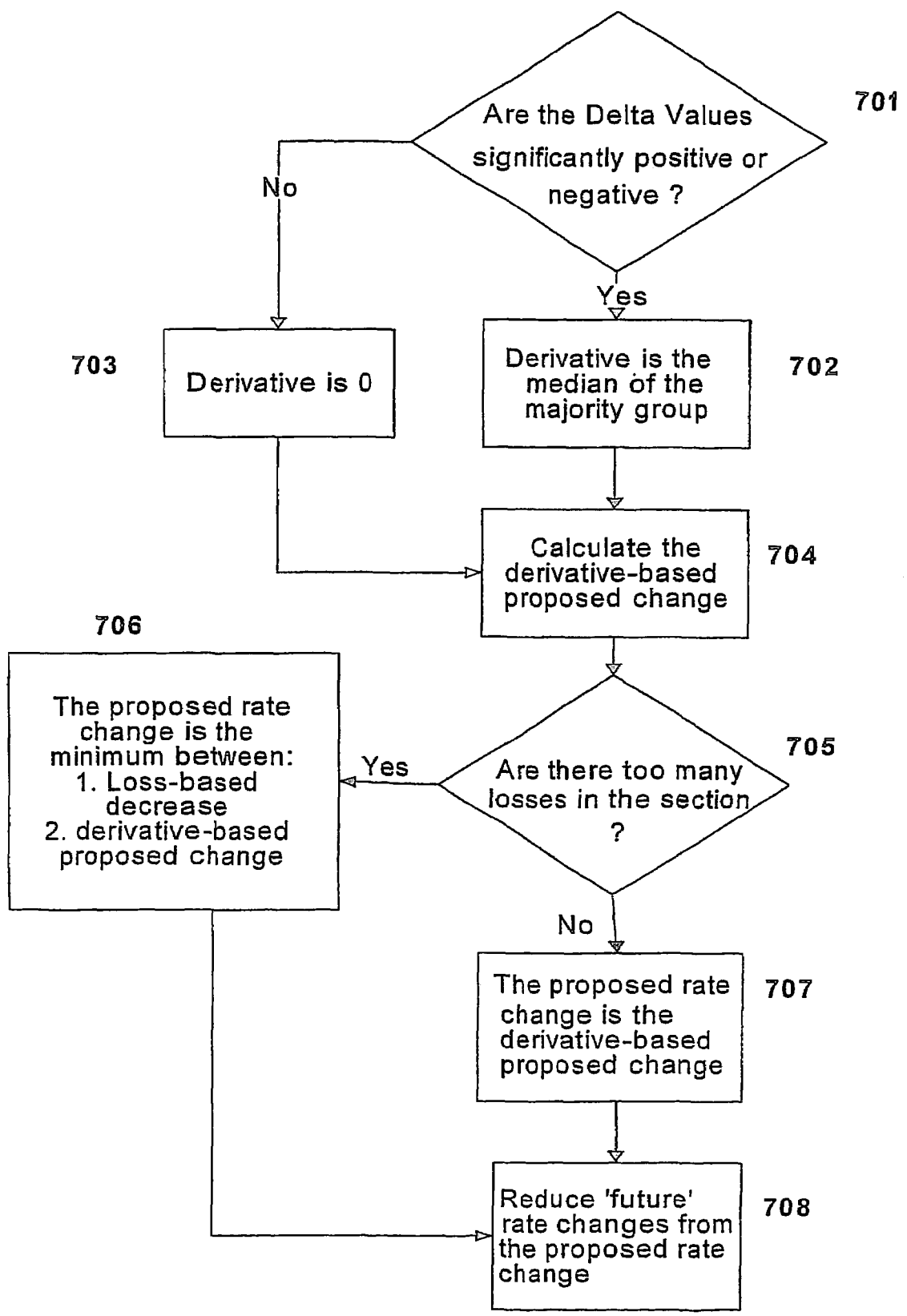
FIG. 6 is a flow chart illustration of the method of analyzing a single window section of FIG. 5, operative in accordance with an embodiment of the present invention.

FIG. 6, to which reference is now made, is a flow chart illustration of a method that may be used in analyzing a single window section, operative in accordance with an embodiment of the present invention. This figure corresponds to iteration of step 604 of FIG. 5 and may be performed once per window section.

Controller manager 414 may apply a "sign-significance filter" to each of the delta values in the section (step 701). This test may be used to determine whether the value is either "significantly positive" or "significantly negative". For example, it may check if the percentage of positive values in the delta list exceeds a certain threshold. A similar check may be done for negative values. If there is a significant value, the change (or derivative) may be calculated as the median of the majority group (whether positive or negative) and the other delta values may be disregarded (step 702). Otherwise, the derivative of the window section may be set to "0" (step 703).

Thus, the "sign-significance filter" may be used to determine whether there is a clear tendency in the delta values of the window section. This may be necessary as the use of the median may provide only a rough way to filter out exceptional values. Disregarding the other delta values may assist in a situation in which the tendency of the section's derivative is clear, yet exceptional values exist.

Controller manager 414 may calculate a single proposed rate change value for the window section from the derivative (step 704). This value may be called the "derivative-abased proposed change". For a non-zero derivative, the derivative-based proposed change may be derived as follows. Given X milliseconds (msec) as the time between consecutive packet transmissions, and a derivative value of Y msec, the proposed rate change may be calculated so that the time between consecutive, packet transmissions may be X+Y msec.

A zero derivative may indicate one of the two following situations:

1. The transmission rate has reached a level in which it is adequate for the current conditions. The congestion level in the buffers is constant, and hence the derivative may be zero, or 2. The transmission rate is too low for the current conditions, but the buffers are totally empty. In such a case, the wait-time of all packets in the buffers may be "0" and therefore the derivative may be zero.

Since it may be hard to distinguish between the two situations and since under-utilization of the line may be considered more critical, a too low for transmission rate may be assumed (case 2). Thus, in the case of a derivative of zero the rate may be increased. Such an increase may be called a "zero derivative increase". This increase may be proportional to the capacity of the communication line (for example, 15% of the capacity). It is noted that even in the case of the first situation, the rate recalculations described hereinbelow may identify that the rate is too high, and may decrease it.

Controller manager 414, may next check if the percentage of lost packets, out of the total number of packets transmitted in the examined section, exceeds a certain threshold (step 705). If it does, the minimum between the derivative based proposed change and the "loss based decrease" may be used as the proposed rate change of the window section (step 706). The loss based decrease value may decrease the value by a constant, which may be proportional to the line's capacity, for example, by 15 percent of capacity. If the derivative-based proposed change is not "negative enough" the rate may not be decreased enough and therefore the loss based decrease may be selected instead.

If the loss percentage does not exceed the threshold, the proposed rate change for the section may use the derivative based proposed change (step 707).

Since the packets in the examination window may have been transmitted prior to the calculation time, it may be the case that the transmission rate has changed. The current transmission rate may no longer be the same as at the time the section was transmitted. This fact may be taken in consideration when calculating the proposed rate change. Thus, the proposed rate change may be reduced in relation to "future rate changes" (step 708). For example, if the rate of the window section was 9000 bit/sec, the proposed change −3000 bit/sec, and the current transmission rate 7000 bit/sec, then the actual change needed is only −1000 bit/sec. This may be calculated by subtracting the current transmission rate from the transmission rate at the time the section was transmitted giving a rate difference. Then this rate difference may be subtracted from the proposed rate change, giving a rate reflecting the current transmission value.

Figure 7:
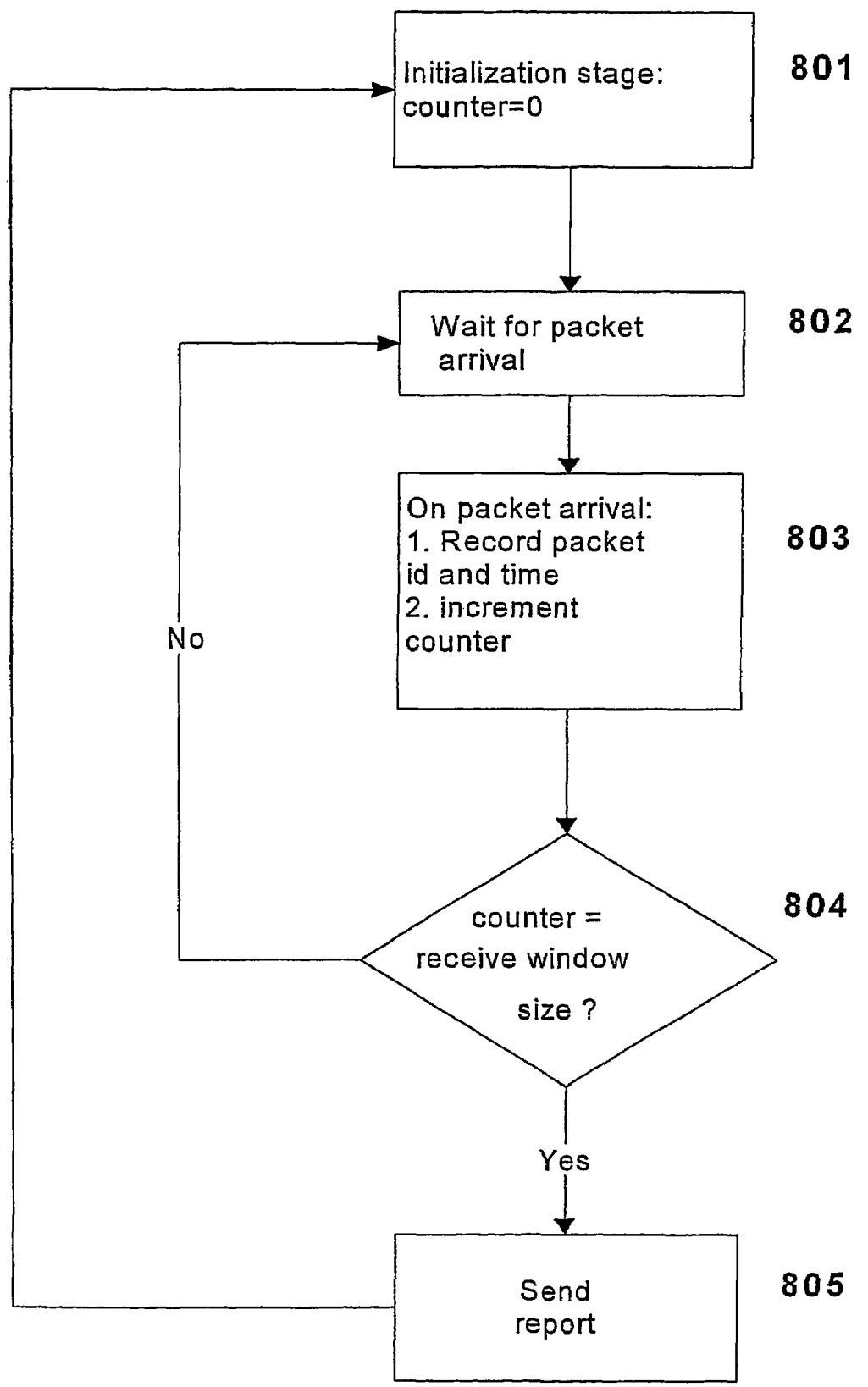
FIG. 7 is a flow chart illustration of a method embodied by the report manager of FIG. 3, operative in accordance with an embodiment of the present invention.

Reference is now made to FIG. 7, a flow chart illustration of a method executed by reporter manager 432 and reporter interface 433 of rate reporter 430 (FIG. 3), operative in accordance with an embodiment of the present invention. Reporter manager 432, per each connection, may initialize a counter to zero and may create a report table 460 (step 801). Report table 460 may be used for recording the unique ID numbers of packets that are received and the time of receipt of the packet. Once a packet has been entered in report table 460 it may be referred to as a "reported packet". Reporter interface 433 may now wait for a packet to arrive (step 802).

Upon receipt of a packet, reporter interface 433 may update report table 460 as described and may increment the counter (step 803). Reporter interface 433 may then check whether the counter has reached a pre-defined value, which may be named "receive window size", for example, that the counter is equal to 100 (step 804). Other possible conditions may be that a pre-determined period of time has elapsed, or that a given predetermined time has been passed. If not, reporter interface 433 may return to step 802 and may wait for the next packet.

Otherwise, reporter interface 433 may format report table 460 into a data packet and may add a transport protocol header to report table 460. For example, using UDP/IP, the header may include the address of transmitting station 110. Reporter interface 433 may then send report table 460 to rate controller manager 410 over network 420 (step 805), and may return to initialization step 801. Note that report table 460 sent in step 805 may be used as input in step 520 (FIG. 4).

In a further embodiment of the present invention, the rate recalculations may be transmitting side. This embodiment may require the following modifications to the above-described system. Each packet sent by controller interface 413 may include its transmission time in its header. There may be a single table managed by reporter 430 instead of the two tables described hereinabove. When a packet arrives, both its transmission time and its arrival time may be available, and therefore the latency may be calculated and may be written into a new column in the table.

When there is enough information in the table, the rate recalculation may be performed by reporter manager 432 in a manner similar to that performed by controller manager 414 as described hereinabove with respect to FIGS. 5 and 6. The new rate may be transmitted by reporter interface 433 to rate controller manager 410, which may update the transmission rate. It is noted that in this embodiment, transmission of report table 460 as described hereinabove in step 805 may be unnecessary.

As may be understood from the descriptions above, the tasks of rate reporter 430 may be divided between two separate units, reporter manager 432 and reporter interface 433. It is noted however, that in a further embodiment of the present invention these two logical units may be combined in a single unit.

It is hereby noted that, within the description hereinabove, the word "packet" is merely a name for a chunk of data and that other names, such as "segment", "frame", etc., are also possible and are included within the scope of the present invention.

Alternative embodiments will become apparent to those skilled in the art to which the present invention pertains without departing from its spirit and scope. It will thus be appreciated by persons skilled in the art that the present invention is not limited by what has been particularly shown and described herein above. Rather the scope of the invention is defined by the claims that follow:

What is claimed is:

1. A method for controlling the transmission rate of data packets between a transmission station and a receiving station, the method comprising:
    calculating a plurality of latency values, one latency value per data packet of a plurality of data packets; and
    generating at least one rate change based on said plurality of latency values,
    wherein said one latency value per packet is calculated as the difference between the receiving time of said packet measured at said receiving station by a second clock and the transmitting time of said packet measured at said transmitting station by a first clock, wherein said first and said second clocks are independent, and
    wherein generating of said rate change comprising:
        calculating the difference between each pair of consecutive latency values, said difference being a latency delta;
        calculating a representative latency value for a group of consecutive packets which were transmitted at the same rate based on said latency delta values of the group,
        proposing a rate change based on said representative latency value.

2. A method according to claim 1, wherein said latency value is a one-way latency.

3. A method according to claim 1, wherein said generating further comprises using a transmission rate of at least one packet from said plurality of packets.

4. A method according to claim 1, wherein said generating further comprises using a sign-significance filter.

5. A method according to claim 1, wherein said generating further comprises using a zero derivative increase.

6. A method according to claim 1, wherein said generating further comprises using a loss-based decrease.

7. A method according to claim 6, wherein said generating further comprises taking the smallest rate resulting of said loss-based decrease and said representative latency value based proposed change.

8. A method according to claim 1, wherein said generating further comprises using a future rate change.

9. A method according to claim 1, wherein said generating further comprises computing a weighted average of said at least one rate change.

10. A method according to claim 1, wherein said generating further comprises using a capacity of at least one communication line, and said transmission is using protocol.

11. A method according to claim 10, wherein said protocol is a connectionless protocol.

12. A method according to claim 11, wherein said connectionless protocol is UDP/IP.

13. A method according to claim 10, wherein said protocol is a connection protocol.

14. A method according to claim 13, wherein said connection protocol is TCP/IP.

15. A method according to claim 1, wherein said generating is able to be done on a transmitting side.

16. A method according to claim 1, wherein said generating is able to be done on a reporting side.

17. A method according to claim 8, wherein said future rate change is reduced from said representative latency value based proposed change.

18. A method according to claim 1, wherein said proposing further comprises comparing results of said computing to line capacity.

19. The method of claim 1, wherein the generating of said rate change further comprising:

defining a significant value of latency for said section said significant value being positive when the percentage of positive latency delta values exceeds a first predefined value, being negative when the percentage of negative latency delta values exceeds a second predefined value and as being zero otherwise.

20. The method of claim 1, wherein said representative latency value is being the median of the group having more latency delta values between the group of positive latency delta values and negative latency delta values.

21. The method of claim 1 wherein said proposed rate change is set so that the time difference between the transmission of each pair of consecutive packets is the algebraic sum of the time present difference between the transmission of each pair of consecutive packets and the representative latency value.

22. A system comprising;
a rate controller controlling the transmission rate of data between a transmission station and receiving station over a network; and
a rate reporter in communication with said rate controller;
wherein the rate reporter is adapted to report receipt time of consecutive data packets received at said receiving station,
wherein the rate controller is adapted to control the transmission rate based on changes in latency values each latency value calculated per packet of consecutive packets as the difference between the receipt time of said packet, measured at said receiving station by a second clock and the transmission time of said packet measured at said transmitting station by a first clock, said first and said second clocks are independent, and
wherein said rate controller is adapted to control said transmission rate using a proposed rate change calculated based on:
latency delta values calculated each as the difference between respective two consecutive latency values off said latency values.
representative latency value calculated for a group of consecutive packets which were transmitted at the same rate based on said latency delta values of the group.

23. A system according to claim 22, wherein said rate controller is located in a transmitting site.

24. A system according to claim 22, wherein said rate controller comprises at least one transmitting packets table.

25. A system according to claim 22, wherein said rate reporter is located in a receiving site.

26. A system according to claim 22, wherein said rate reporter is located at an intermediary node along said network.

27. A system according to claim 22, wherein said rate reporter comprises at least one report table.

28. A system according to claim 27, wherein said rate reporter comprises a unit adapted to send said at least one report table to said rate controller.

29. A system according to claim 22, wherein said rate controller comprises a unit adapted to compute a proposed rate change.

30. A system according to claim 22, wherein said rate reporter comprises a unit adapted to compute a proposed rate change.

31. A system according to claim 22, comprises a unit adapted to compute a proposed rate change from a transmitting packets table.

32. A system according to claim 22, comprises a unit adapted to compute a proposed rate change from a report table.

33. The system of claim 22 wherein said rate controller is further adapted to define a significant value of latency for said section said significant value being positive when the percentage of positive latency delta values exceeds a first predefined value, being negative when the percentage of negative latency delta values exceeds a second predefined value and being zero otherwise.

34. The system of claim 22 wherein said representative latency value is being the median of the group having more latency values between the group of positive latency delta values and negative latency delta values.

35. The system of claim 22 wherein said proposed rate change is set so that the time difference between the transmission of each pair of consecutive packets is the algebraic sum of the time present difference between the transmission of each pair of consecutive packets and the representative latency value.

* * * * *